Figure 12:
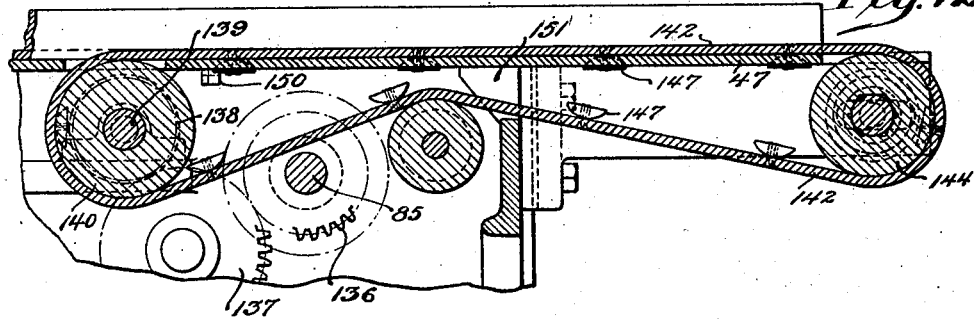

May 20, 1924.
E. H. DAVIS
1,494,774
CAKE CUTTING MACHINE
Filed May 29, 1923    10 Sheets-Sheet 1
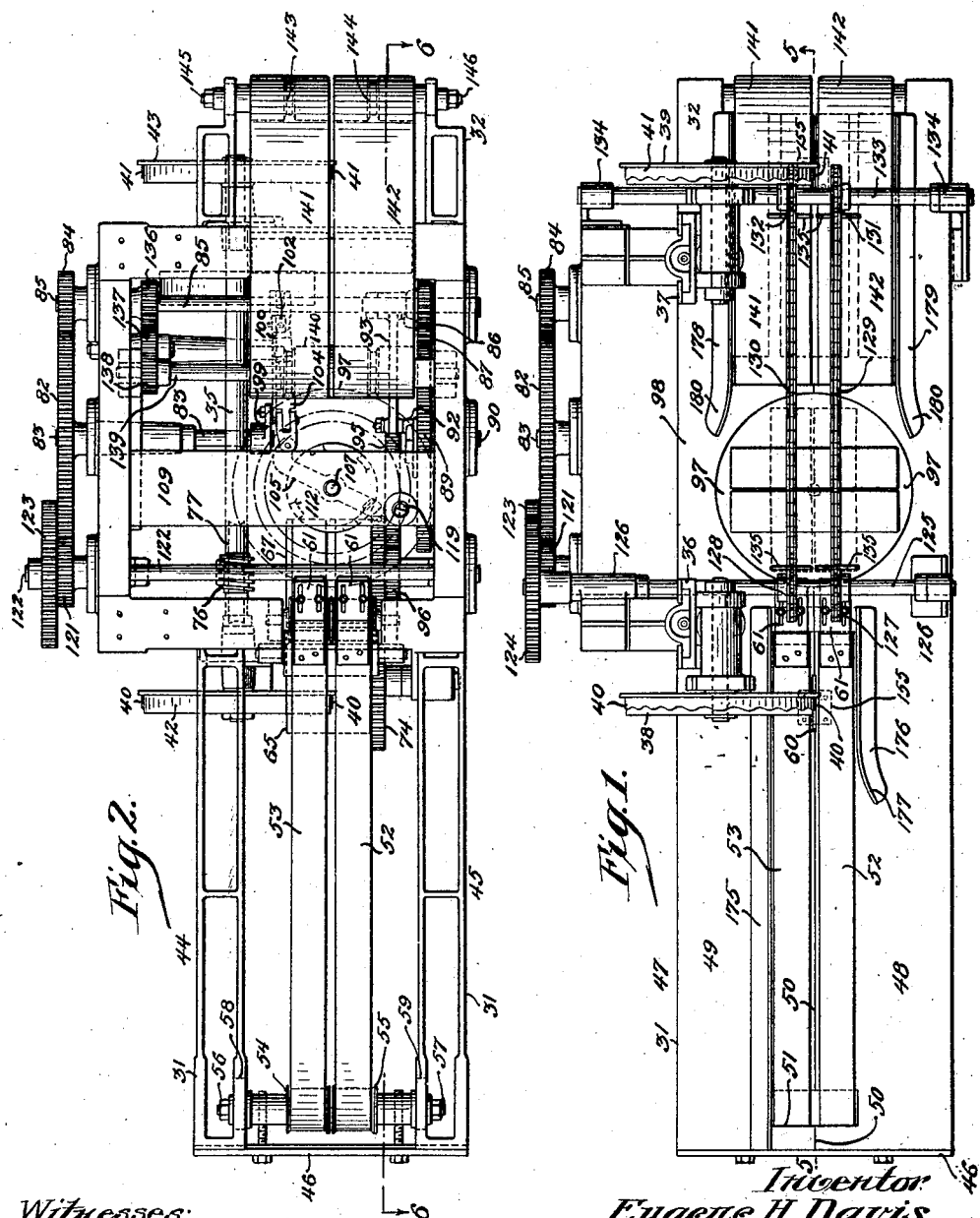
Witnesses:
Walter Chism
William Simpkin.
Inventor
Eugene H. Davis
by Augustus B. Copper
his Attorney.

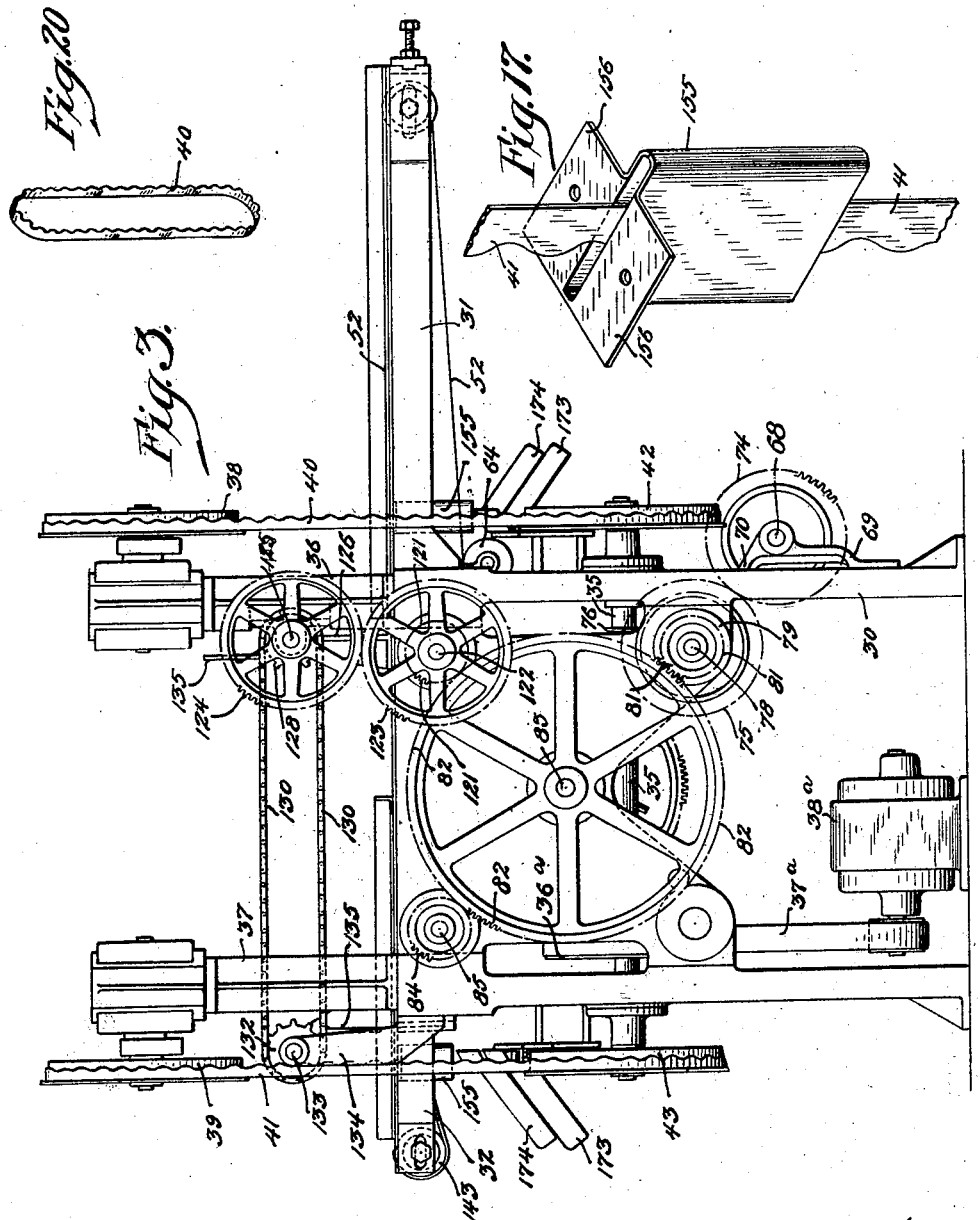

May 20, 1924. 1,494,774
E. H. DAVIS
CAKE CUTTING MACHINE
Filed May 29, 1923 10 Sheets-Sheet 3
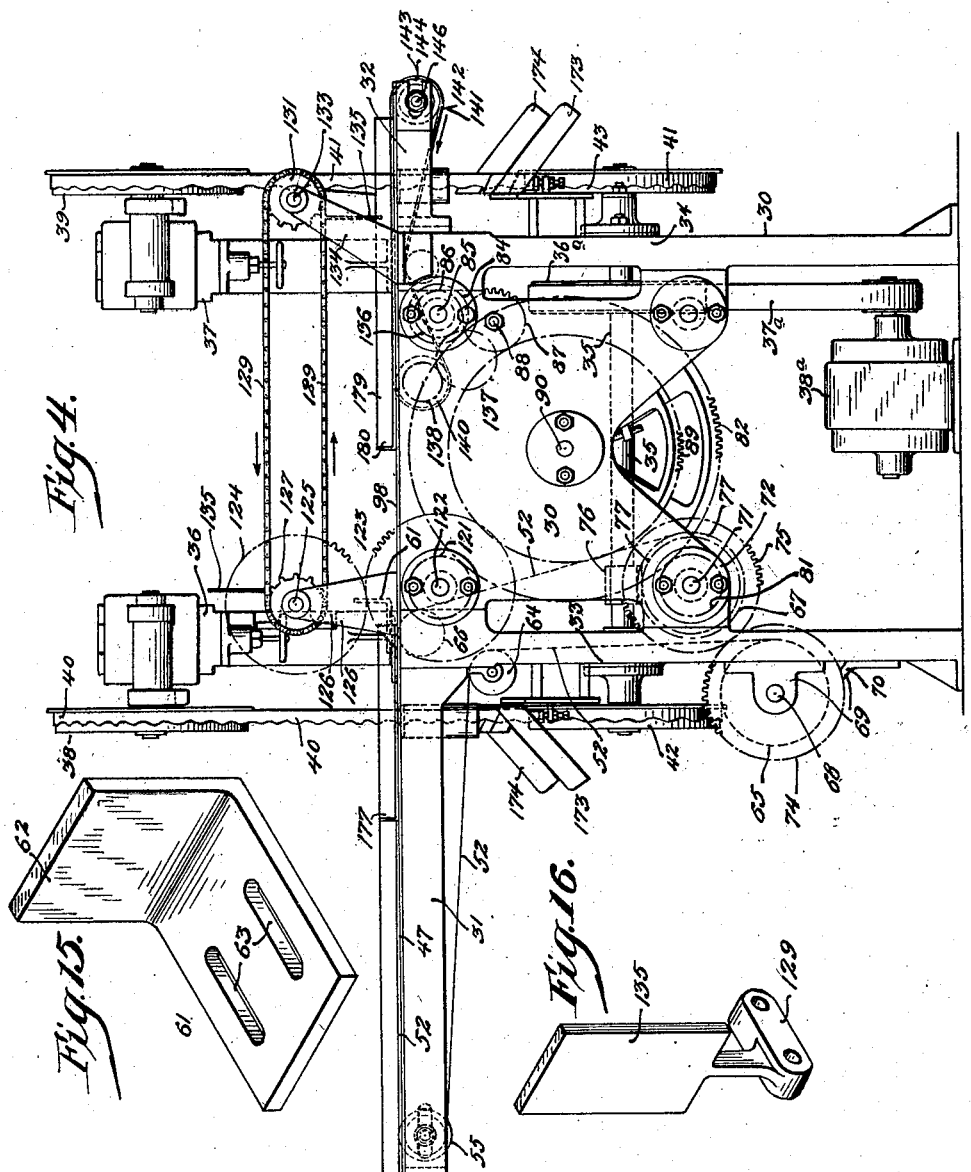
Witnesses:
Walter Chism
William Simpkin
Inventor:
Eugene H. Davis
by Augustus B. Copper
his Attorney

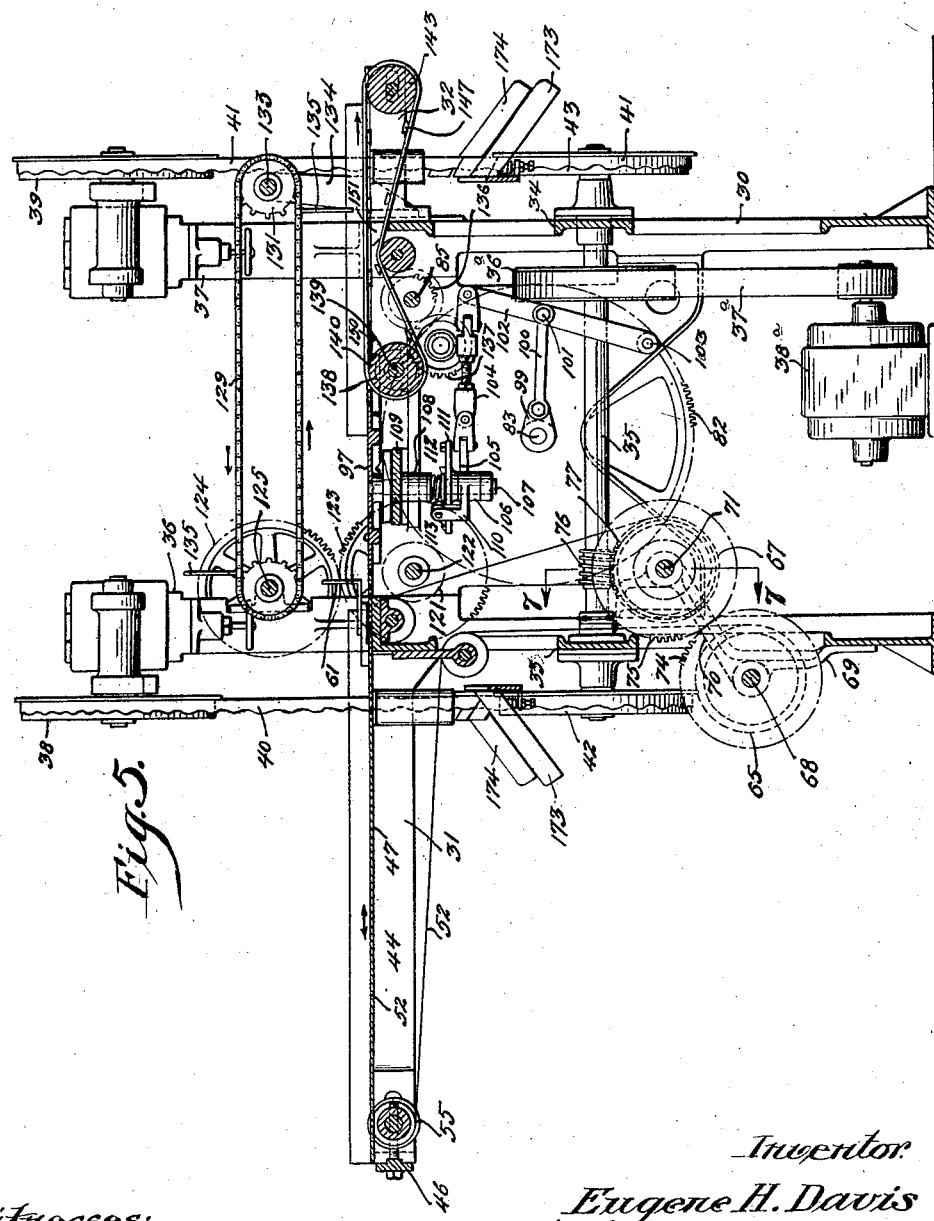

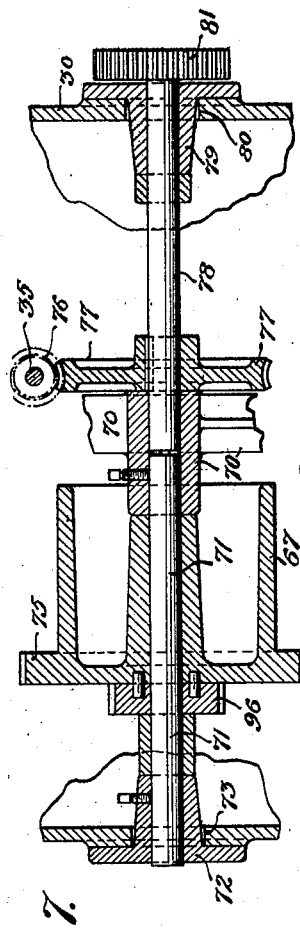

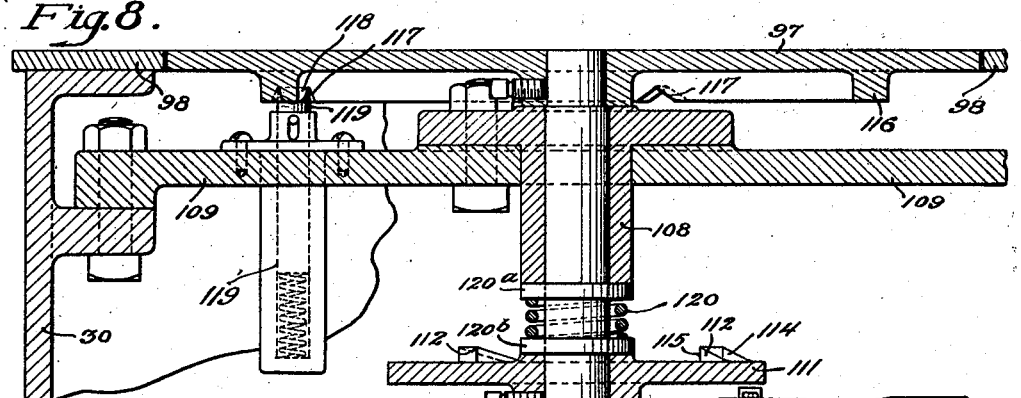
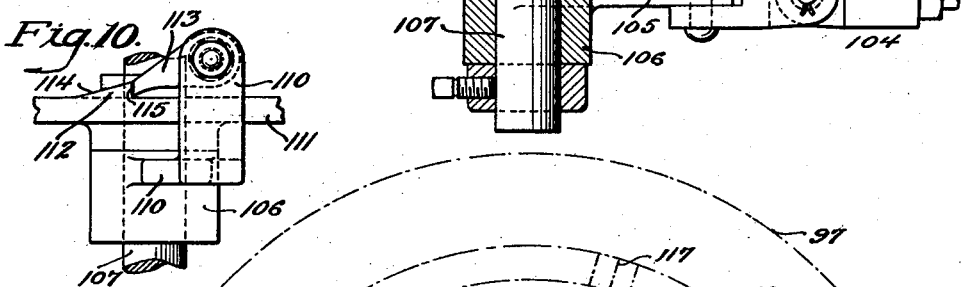
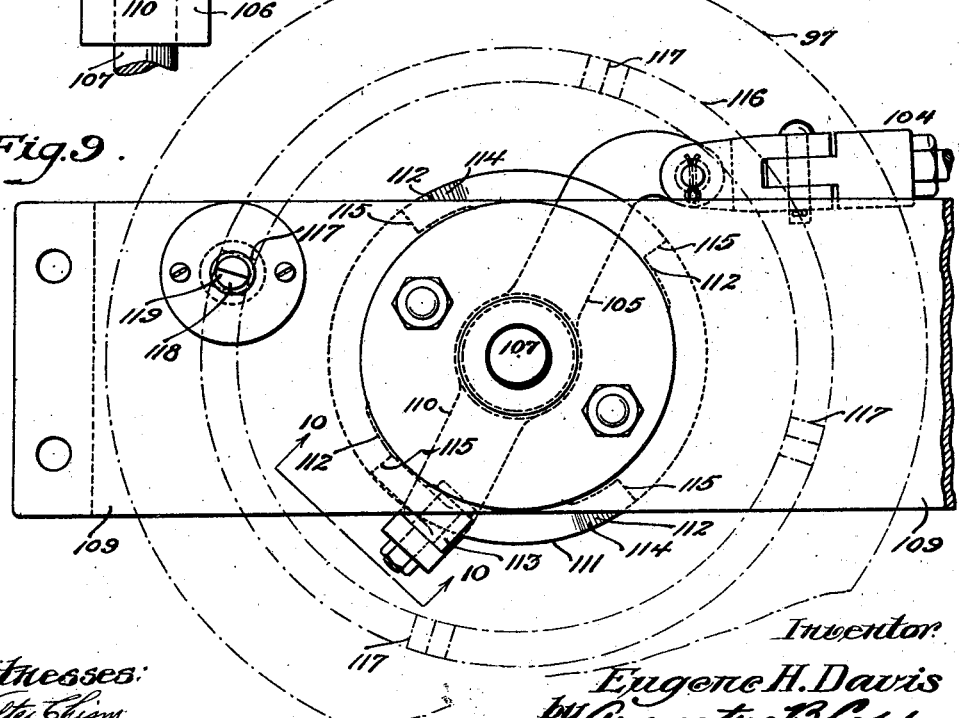

May 20, 1924.

E. H. DAVIS 1,494,774

CAKE CUTTING MACHINE

Filed May 29, 1923    10 Sheets-Sheet 7

Witnesses:
Walter Chism
William Simpkin

Inventor
Eugene H. Davis
by Augustus B. Copper
his Attorney

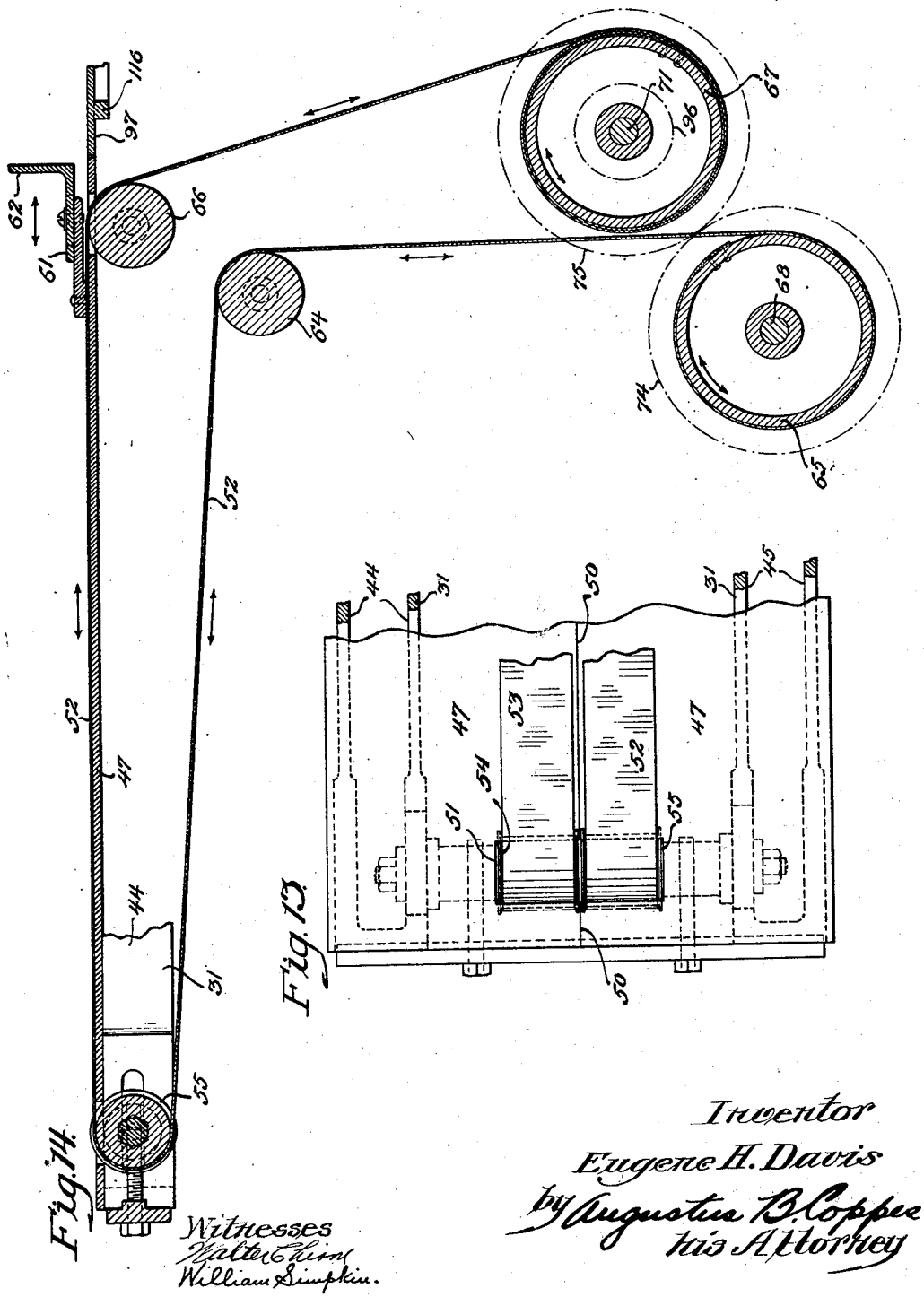

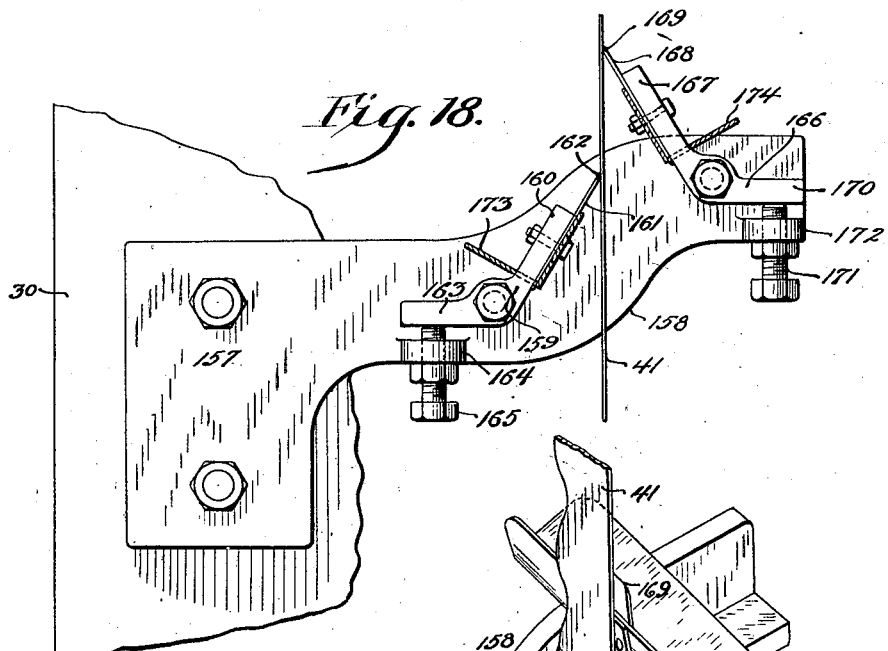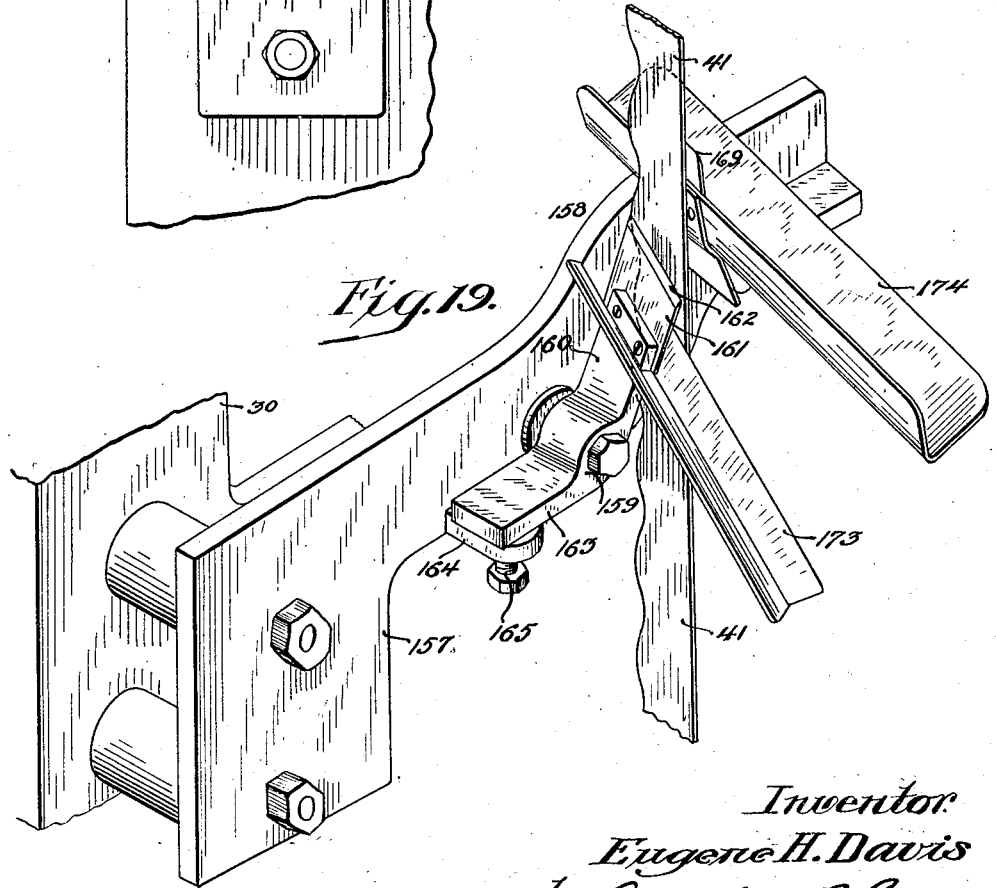

May 20, 1924.  
E. H. DAVIS  
CAKE CUTTING MACHINE  
Filed May 29, 1923  
1,494,774  
10 Sheets-Sheet 10
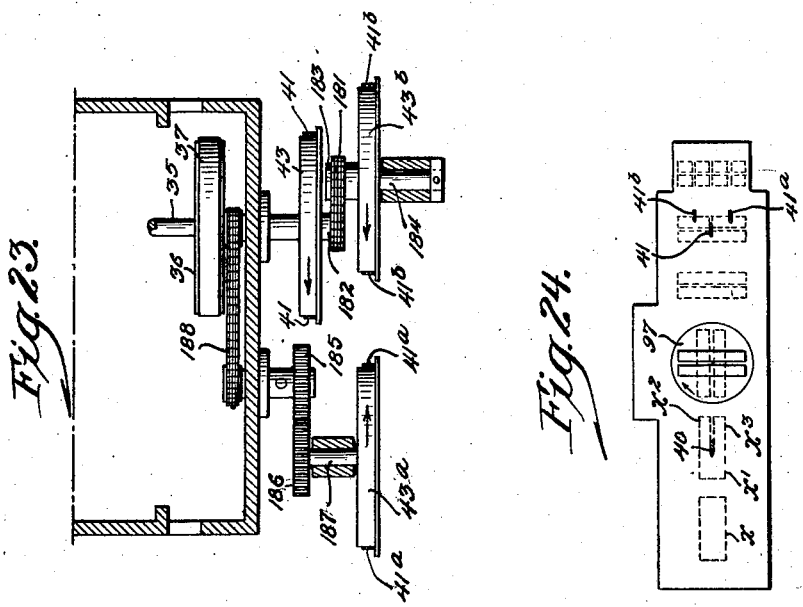
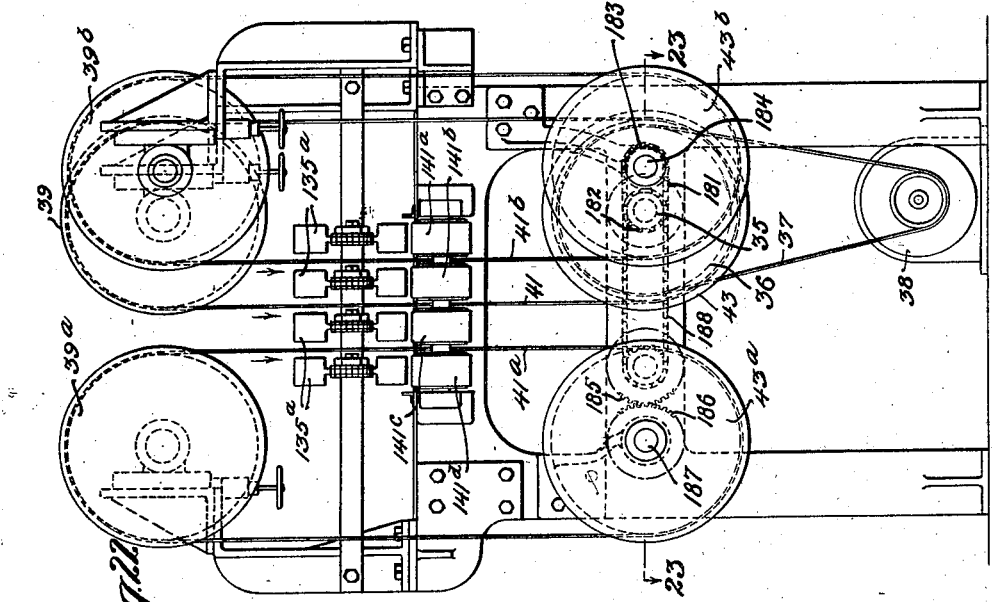

Patented May 20, 1924.

1,494,774

UNITED STATES PATENT OFFICE.

EUGENE H. DAVIS, OF PHILADELPHIA, PENNSYLVANIA.

CAKE-CUTTING MACHINE.

Application filed May 29, 1923. Serial No. 642,230.

*To all whom it may concern:*

Be it known that I, EUGENE H. DAVIS, a citizen of the United States, residing in Philadelphia, Pennsylvania, have invented certain Improvements in Cake-Cutting Machines, of which the following is a specification.

My invention relates to cake cutting machines of the type capable of cutting large cakes or slabs of cake into a number of small cakes.

It is well known that present day cake bakeries have built up a large business selling small rectangularly cut cakes which are bought for household, lunch and picnic use. To make these small cakes, large cakes or slabs of cake are baked and then cut into such sizes as to be readily saleable for the above purposes. Owing to the fact that these large cakes are fresh when cut and are also fragile, great waste occurs during the cutting and during the time they are being moved toward and from the cutting means on the machines. One of the objects of my invention is to produce a machine which will reduce the waste to a minimum and at the same time to effect a rapid cutting of the cakes without requiring so much of the personal attention of an operator as was heretofore necessary.

Another object is to so make my improved machine that it can be operated by a small amount of power and can be easily cleaned and adjusted.

A still further object is to make my improved machine in such a manner that it will be strong and durable in use and will not readily get out of order.

A further object is to provide my improved machine with band knives having waved edges capable of producing clean cuts: the knives being so arranged as to be capable of cutting a large cake into four or more small cakes during the progress of the material once through the machine.

Another object is to provide improved means which will be operative after the cake has first been cut to turn the cut portions automatically so as to allow subsequent cutting in a path or paths at angles to the first cutting of the cake.

Another object is to provide improved means which will keep said band knives clean without injury to the knives, and therefore prevent the collection of any material on the knives which might otherwise cause an irregular cut in the cakes, or which might cause the cake to be broken, and therefore not fit for sale.

A still further object is to so construct my improved machine that it can be made and sold at a reasonable price and will not take up much room considering the amount of work which the machine is capable of doing.

Figure 11:
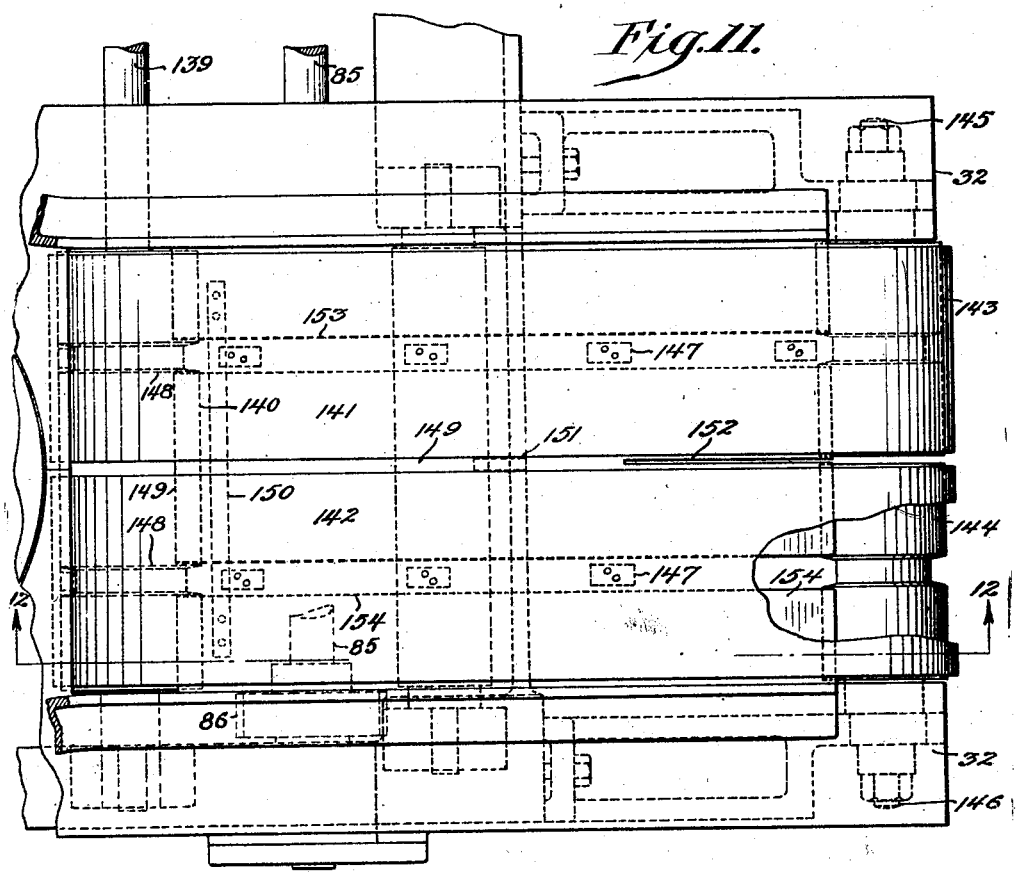

These objects, and other advantageous ends which will be set forth hereinafter, I attain in the following manner reference being had to the accompanying drawings, in which Figure 1 is a top plan view of my improved machine, Figure 2 is a plan view of said machine with certain of the parts removed to illustrate others which are below them, Figure 3 is a longitudinal elevation of my improved machine, Figure 4 is an elevation of the opposite side of the machine from that shown in Figure 3, Figure 5 is a sectional elevation through said machine, said section being taken on the line 5—5 of Figure 1, Figure 6 is a sectional elevation taken on the line 6—6 of Figure 2, the upper portion of the machine being omitted, Figure 7 is an enlarged fragmentary section taken on the line 7—7 of Figure 5, Figure 8 is an enlarged fragmentary section taken centrally through the turntable and turning means for the cake, Figure 9 is a plan view of certain of the elements shown in Figure 8, Figure 10 is a fragmentary elevation looking in the direction of the arrows 10—10 in Figure 9, Figure 11 is an enlarged fragmentary top plan view showing certain of the features of my invention, Figure 12 is a section taken on the line 12—12 of Figure 11, Figure 13 is a fragmentary top plan view showing certain of the conveying elements of my improved machine, Figure 14 is an enlarged fragmentary sectional elevation showing the conveying means for moving the cake to receive its first cutting, Figures 15 and 16 are perspective views of certain of the conveying elements, Figure 17 is a perspective view of one of the knife guides which I preferably employ, Figure 18 is a fragmentary end elevation showing knife cleaning means which forms a part of my invention, certain of the parts being shown in section, Figure 19 is a perspective view of the knife cleaning means shown in Figure 18, Figure 20 is a perspective view of one of the band knives which I preferably employ, Figure 21 is a diagrammatic top plan view illustrative of the various stages of the cutting and turning of the cake during its progress through the machine, allowing a cake to be cut into four smaller cakes, Figure 22 is an end elevation of a machine made in accordance with my invention and illustrating a slight modification allowing three band knives to operate upon the cake after having first been cut and turned by means shown in the previous figures of drawings, Figure 23 is a section on the line 23—23 of Figure 22, Figure 24 is a view of generally similar character to that shown in Figure 21 and illustrating how the knife arrangement of Figures 22 and 23 can be made to cut a cake into eight smaller cakes, and Figure 25 is a top detail plan view of one of the sections of the top cover.

Referring to the drawings and particularly to Figures 1 to 21 inclusive, 30 represents the main frame of the machine, which adjacent its top, has front and rear extensions 31 and 32 respectively. The front and rear portions 33 and 34 of the main frame form supports for the bearings of a main drive shaft 35. This shaft 35 has a pulley 36ᵃ thereon which is driven from a belt 37ᵃ and said belt is driven from an electric motor 38ᵃ which can be placed within the confines of the main frame 30 and if desired can be mounted upon the floor upon which the machine is mounted. The main frame includes two standards 36 and 37 which form the support for two pulleys 38 and 39 over which pass two band knives 40 and 41. The lower portions of the band knives 40 and 41 pass around pulleys 42 and 43 respectively on the main driving shaft 35. The band knives 40 and 41 preferably have their forward edges wavy or scalloped to provide a greater length of cutting edge than is possible with a straight edge band knife. The cutting edges of both of said band knives extend forward and each of said knives has one of its runs in the path of travel of the cake to be cut as will be more fully understood by the following description. The front extension 31 of the frame includes side portions or arms 44 and 45 as shown in Figure 2 and these arms are preferably made of a skeleton character which are joined together at their outer ends by an end or head plate 46. The cover or top plate 47 is preferably mounted on the extension 31 as shown in Figure 1 and this top 47 can be made in two sections 48 and 49 which have a parting 50; said plates being notched out at their parting adjacent the forward end of the machine to provide an aperture 51 outward through which pass portions of flexible strip conveyors 52 and 53. These strip conveyors are preferably made of thin sheet metal which will readily flex so as to allow them to pass around idler rollers 54 and 55 which are adjustably mounted on studs 56 and 57. The studs 56 and 57 are preferably mounted in slots 58 and 59 in the arms 44 and 45 adjacent the outer end of the extension 31. The studs are provided with nuts which are located within the spaces of the arms and can be readily tightened or loosened to allow adjustment. The parting 50 of the top 47 is slightly enlarged or notched to provide a slit 60 to allow the operating run of the band knife 40 to pass therethrough as clearly shown in Figure 1. Portions of the strip conveyors 52 and 53 have cake pushers 61 secured thereto, said cake pushers having upright pushing portions 62. The cake pushers can be bolted to the strip conveyors and preferably include slots 63 as shown in Figure 15 to allow adjustment by the bolts. The strip conveyors have portions which pass over idler rollers 64 on the frame and then downward around a drum 65, said portions of the conveyors having their ends secured to said drum 65. The other portions of the strip conveyors after passing over the top 47 pass over idler rollers 66 and then downward around a drum 67 and have their ends secured to said drum 67. The drum 65 is mounted on a shaft 68 in a bearing 69 supported on the frame 30. A part 70 of the bearing 69 extends through an opening in the front of the frame 30 and supports one end of a shaft 71 as clearly shown in Figures 5 and 7. The other end of said shaft is mounted in a bearing 72 which is secured to the main frame 30 and has a portion which extends through an opening 73 in said frame. The drum 67 is mounted on the shaft 71 and can freely rotate thereon when operated by means hereinafter described. Thus it will be understood that each of the strip conveyors has one of its ends secured to the drum 65 and its other end secured to the drum 67, portions of the strips being spirally wound on said drums. The drums 65 and 67 have gear wheels 74 and 75 respectively formed thereon which intermesh so that a rotation of one drum will cause the rotation of the other drum in an opposite direction. Thus if one of the drums is oscillated, a portion of the strips will be wound thereon and a portion of the strips will be unwound from the other drum and vice versa when the direction of rotation of the drums is changed. It may be here stated that during the operation of the machine the drum 67 is oscillated so as to rotate first in one direction and then in another, thus causing the cake pushers 61 to reciprocate over the top 47 and if cakes are placed upon the top 47 on portions of the strip conveyors 52 in the path of travel of the cake pushers 61 the cakes will be pushed to the operating run of the band knife 40 and will be cut by said band knife 40. To carry out this action I have provided the following means in the form of my invention as illustrated: A worm 76 is secured to the main driving shaft 35 and operates a worm wheel 77 which is secured to a shaft 78 in alignment with the shaft 71 as shown in Figures 3 and 7. This shaft 78 is rotatable and has one end journaled in the bearing portion 70 and the other end journaled in a bearing 79 which is secured to the main frame at a position opposite the bearing portion 72 as clearly shown in Figure 7. This bearing 79 has a part which extends through a hole 80 in the main frame and is, therefore, mounted in a manner similar to the bearing portion 72. The shaft 78 has a gear wheel 81 secured thereto and this gear wheel drives a gear wheel 82 which is mounted on a shaft 83 journaled on one side of the main frame 30. The gear wheel 82 drives a gear wheel 84 on a shaft 85 which is journaled in bearings on the main frame. The shaft 85 has a gear wheel 86 thereon as shown in Figure 6 which meshes with an intermediate gear wheel 87 journaled on a stud shaft 88 on the main frame and the intermediate gear wheel 87 meshes with a gear wheel 89 which is mounted on a stud shaft 90 journaled in the opposite side of the main frame to that in which the gear wheel 82 is journaled. The gear wheel 89 at its side carries a crank pin 91 to which is pivoted one end of a pitman 92. The pitman 92 is pivotally connected at 93ª to a quadrant 93 and the quadrant is pivotally connected at 94 to the inner portion of the main frame. The quadrant 93 has a segmental portion 95 consisting of teeth which mesh with the teeth of a pinion 96 which is secured to the drum 67. It will be noted that during rotation of the gear wheel 89 that the quadrant will be oscillated on the pivot 94 and will impart an oscillating movement to the drum 67. Since the drum 67 is operatively connected to the drum 65 by means of the gear wheel portions 74 and 75, said drums will be rotated first in one direction and then in an opposite direction thereby causing said reciprocation of the portions of the strip conveyors 52 as above stated.

During the cutting operation of my improved machine the cake after being cut by said band knife 40 is pushed by the pushers 61 upon a turn table 97 which is mounted preferably with its top on the same level with the upper surface of the top 47; the portions 98 of the top 47 being cut out circularly to admit the upper portion of the turntable to allow freedom of rotation of the turntable and at the same time not allowing any extensive parting.

I have provided means of novel construction for moving the turntable intermittently on its axis to the extent of ninety degrees. As clearly shown in Figures 2, 5, 8, 9 and 10, the shaft 83 has a crank 99 secured thereto to which is connected a rod 100 which is pivotally attached at 101 to a lever 102. The lever 102 is pivotally connected at 103 on a portion of the main frame 30 and at its upper end said lever 102 is connected by a rod or connecting means 104 to a lever arm 105. This lever arm projects from a collar 106, freely rotatable on a depending post 107. The post 107 depends axially from the turntable 97 and is mounted in a bearing 108 which is supported by a bracket 109 as clearly shown in Figure 8. The bracket 109 is supported on portions of the main frame and serves to support the turntable and its post. The collar 106 has a second arm 110 which at its outer end extends upwardly in a position outside of a disk 111. This disk has lugs 112 spaced circumferentially of the axis of the post 107 and are arranged at ninety degrees apart. The upwardly extending end of the arm 110 has thereon a pivoted latch 113. The lugs 112 have beveled portions 114 which lead downwardly from upright shoulder surfaces 115. The latch 113 under certain conditions hereinafter described is adapted to abut the shoulder surfaces 115 of the lugs 112 and intermittently cause rotation of the disk 111. The disk 111 is secured to the post 107 and the turntable 97 thereby receives an intermittent rotatable movement to the extent of ninety degrees at each reciprocation of the rod 104. In other words during the operation of the machine, the shaft 83 receives a constant rotatable movement and this movement imparts an oscillating movement to the lever 102. This oscillating movement is transmitted to the collar 106 and latch 113 and the latch by engaging the shouldered surfaces 115 of the lugs 112 when the collar is moving in one direction will move the disk, and when the collar 106 is moving in the opposite direction, the latch will merely drag over the top of the disk and inclined surfaces 114 and drop behind the shouldered surfaces of the next lug 112 in the series. The connecting means 104 is preferably made adjustable so as to compensate for any variation due to wear of the parts or for any other reason.

In order to prevent the inertia of the turntable from carrying it beyond the prescribed distance, namely that of ninety degrees, I provide the turntable with a depending circular flange 116 and form in the bottom of said flange notches 117. These notches are arranged at ninety degrees apart and are adapted to be engaged by the upward beveled end 118 of a spring pressed plunger 119, said plunger being supported by the bracket 109. The arrangement is such that when the turntable is being moved by the aforesaid means, the spring plunger will be depressed out of the notch into which it previously moved and when the next notch in succession passes over the top of the plunger said plunger will enter said latter mentioned notch so that if the means for operating the turntable has completed its full movement forward and returns, the friction exerted by the spring pressed plunger is sufficient to prevent the inertia of the turntable from carrying it beyond its predetermined stopping position. I preferably mount a coiled spring 120 between two fibre washers 120ª and 120ᵇ which frictionally press upon the bearing 108 and disk 111 to keep the turntable from moving backward during the rearward movement of the connecting means 104. Thus the spring 120 and fibre washers serve as an auxiliary to the spring pressed plunger 119. I have mentioned the means 104 as a rod as connecting the arm 105 with the lever 102, however, it will be understood that this connection 104 in the form illustrated, includes flexible portions in the form of a universal joint construction which permits the movement of the arm 105 in one plane while the lever 102 moves in another plane.

The gear wheel 82 drives a gear wheel 121 which is secured on a shaft 122, said shaft having bearings in the main frame 30. A gear wheel 123 which is mounted on the shaft 122 meshes with another gear wheel 124 on a transversely positioned shaft 125. This shaft 125 is mounted in bearings 126 which project upwardly from the top of the main frame 30. The shaft 125 has sprocket wheels 127 and 128 secured thereto as shown in Figures 1, 3, 4 and 5. These sprocket wheels are located in planes at opposite sides of a vertical plane passing centrally between the portions of the conveyor strips 52 and 53 on the top 47. Sprocket chains 129 and 130 pass around the sprocket wheels 127 and 128 and extend longitudinally of the machine above the turntable and the portions of the machine forwardly and rearwardly of the turntable. The rear portions of the sprocket chains pass around sprocket wheels 131 and 132 which are mounted on a transversely extending shaft 133. This shaft 133 is mounted in bearings 134 which project upwardly from the top of the main frame 30. These chains 129 and 130 carry conveying paddles 135 and in the present instance I have illustrated two of these paddles on each of the sprocket chains 129 and 130. The purpose of these paddles is to push the cake off the turntable after the cake has been cut by the band knife 40 and after the turntable has been rotated ninety degrees so as to turn the cake with the cut parting of the cake at right angles to that in which it was positioned when passing rearwardly from the band knife 40 and so that it can be fed to the cutting run of the band knife 41. I provide other conveying means upon which the cake is pushed after it has been moved off the turntable and this conveying means serves to move the cake while it is receiving its last cutting by the band knife 41 and to discharge the completely cut cake from the rear of the machine.

I will now describe the latter mentioned conveying means and the part of my improved machine which operates said conveying means. The shaft 85 has a gear wheel 136 thereon which meshes with an intermediate gear 137. This intermediate gear operates a gear wheel 138 on a shaft 139 upon which a roller 140 is secured. The roller 140 extends transversely of the machine and has two conveyor belts 141 and 142 passing therearound. The conveyor belts 141 and 142 at their rear ends are respectively supported by two other rolles 143 and 144 as shown clearly in Figures 11 and 12. The rollers 143 and 144 are freely rotatable on studs 145 and 146 respectively. These studs are adjustably secured to the rear extension 32 of the frame. The conveyor belts 141 and 142 have guiding lugs 147 which are secured to their inner surfaces and are adapted to pass within grooves 148 of the rollers 140, 143 and 144 so as to keep the conveyor belts evenly spaced as shown in Figure 11. The rollers and conveyor belts are so positioned that the upper runs of the belts are on practically the same level as the top of the turntable 97 so that when the cake, after receiving its first cutting, is pushed from the turntable by the paddles 135 the cakes will be pushed upon the conveyor belts and conveyed to the band knife 41, said band knife having its cutting run extending between the belts 141 and 142. The table top portion 98 is extended to provide a top or cover for the extension 32 of the frame, and the central portion 149 of this top or cover is supported by a bridge 150 and also by a projection 151 of the main frame. See Figures 11 and 12. This portion 149 of the top includes a slit or notch 152 through which the cutting run of the band knife 41 extends so that while the cakes are passing rearwardly by the action of the belt conveyors 141 and 142 they will receive a second cutting separating the original cake into four individual cakes. The top cover at either side of the portion 149 has parts 153 and 154 which are on the level of the portion 149 and are supported by the sides of the rear extension 32. The bridge 150 is supported on the under surfaces of these parts 153 and 154. Thus the upper runs of the conveyor belts 141 and 142 have a support between their rollers and the cake is conveyed without unnecessary vibration to the cutting run of the band knife 41 and also beyond said cutting run of the band knife 41 to the discharge end of the machine.

In view of the construction above described, the cover for the top of the machine which includes the parts 47, 98, 153 and 154 can be made in continuous lengths split in half within the width of the machine and the part 149 can be made a separate part and supported by the bridge 150 and the portion 151 of the frame. By this construction if it is desired to remove the top 47 it is merely necessary to slide the sections off the frame and access can be had to the entire length of the frame for inspection and repair to the parts. Furthermore the top 47 serves as a support for the upper runs of the strip conveyors which feed the cake to the band knife 40 and the cake is thereby conveyed with a minimum amount of vibration so as to prevent injury to the cake.

I prefer to employ guiding means for the operating runs of the band knives at positions between the top and bottom pulleys in order to keep said runs of the band knives in their predetermined proper alignment so as not to deviate from their prescribed paths during the cutting operation. For this purpose I have illustrated guiding tubes 155 of a construction clearly shown in Figure 17, said guiding tubes are preferably provided with flanges 156 which may be screwed to the under portions of the extensions of the frame, said tubes being elongated in cross section.

Furthermore, I provide means of a novel construction for keeping the band knives clean, said means being clearly illustrated in Figures 18 and 19. In said figures of drawings I have illustrated a bracket 157 which is secured to the frame 30, said bracket including an arm 158 upon which is pivoted a lever 159. This lever 159 includes an arm 160 to which is adjustably secured a scraper 161, said scraper having an upper beveled edge 162 which in the direction of its length preferably extends at a slant to the length of the adjacent run of the band knife. The lever 159 has a second arm 163 which is positioned above a lug 164 on the bracket 157. This lug has an adjusting screw 165 extending through a tapped hole therein, and said adjusting screw can be moved so as to engage the arm 163 and thereby cause the beveled end 162 of the scraper 161 to exert more or less pressure against the band knife. In like manner a second lever 166 is pivotally connected to the bracket 157 and said lever 166 includes an arm 167 to which is adjustably secured a scraper 168 having an upper beveled edge 169 which bears upon the opposite surface of said run of the band knife at a different level than the beveled edge 162 of the scraper 161 as clearly shown in Figure 18. The lever 166 has another arm 170 adapted to be engaged by an adjusting screw 171 which extends through a lug 172 on the bracket 157 so that the scraper 168 can be made to bear with more or less pressure against said run of the band knife. It will thus be noted that with the arrangement above described and as illustrated the scrapers will bear with slight pressures in opposite directions against the opposite surfaces of the same run of the band knife, this arrangement being present on both of the band knives at the front and rear of the machine.

I preferably secure discharge troughs 173 and 174 on the lever arms 160 and 161, said troughs being V-shape in cross section. For example, the trough 173 is so secured to the arm 160 that one side of the trough will be located on one side of the scraper 161 and the other side of said trough will be located on the opposite side of said scraper 161. The troughs in the direction of their lengths are inclined so as to slant downward from the scrapers and thus any material which is scraped from the band knives by the scrapers will drop into the troughs and will slide down said troughs and can be collected in any suitable receptacle. It will be noted that the trough 174 is arranged in a manner similar to that described in connection with the trough 173 and in attaching these troughs the troughs can be notched so as to allow the respective scrapers and arms 160 and 161 to extend therethrough in order to produce the arrangement above stated.

During the operation of the machine as illustrated diagrammatically in Figure 21, the cake $x$ is first moved by the strip conveyors 52 and 53 to the band knife 40 and during the progress of the cake past said knife 40 as shown at $x^1$ in Figure 21 the band knife 40 cuts the cake centrally into two parts $x^2$ and $x^3$. The pushing members 61 of the conveyors 52 and 53 push the two parts $x^2$ and $x^3$ of the cake upon the turntable 97 and the machine is so timed that after the cake has been pushed upon said turntable, said pushing members 61 move in an opposite direction to their original starting position and the turntable is moved one quarter turn to turn the parts $x^2$ and $x^3$ of the cake from the dotted line position shown in Figure 21 to the full line position shown in Figure 21. The turntable then stops and the conveyor paddles 135 push the cake off the turntable upon the conveyor belts 141 and 142. The conveyor belts 141 and 142 then convey the cake to the bandknife 41 and said cake is again cut so that the cake when delivered will consist of four small cakes as shown at $x^4$. I preferably time the conveyor belts 141 and 142 in order that they will move at a slightly greater speed than the conveyor paddles 135 and so that after the conveyor paddles have moved the cake upon the conveyor belts 141 and 142 the conveyor belts will ordinarily be the sole conveying means for the final cutting of the cake $x$. However, if for any reason the conveyor belts fail to exert sufficient friction against the cake to cause the cake to be cut by the band knife 41, the conveyor paddles 135 will then serve as auxiliary conveying means to compel the cake to pass the band knife 41 to receive the final cutting. For this reason I preferably extend the conveyor chains for the paddles 135 a distance over the conveyor belts so as to allow said conveyor paddles 135 to serve in said latter auxiliary capacity. For example, if in the event the band knife 41 becomes dull or the conveyor belts 141 and 142 become slippery and the cake is pushed against the band knife and the band knife retards the movement of the cake allowing the conveyor belts to drag under the cake, then the paddles 135 will follow up and push the cake with a positive movement compelling the cake to be cut and at the same time the upright forward surface of the cake will be supported by the conveyor paddles preventing injury to the cake.

I preferably provide the top cover with upwardly flanged guide rails 175 and 176 at positions adjacent the side edges of the strip conveyors 52 and 53. The rail 176 stops short of the forward end of the machine and preferably curves outward as shown at 177. The rail 175 extends beyond the curved end 177 of the rail 176 and the cakes, as they are applied to the machine, can be moved upon the strip conveyors by an operator standing at the side of the machine and the rail 175 will serve as a guide or stop so as to facilitate the proper placement of the cakes upon said strip conveyors. If for any reason a part of the cake would project beyond the outer edge of the strip conveyor 52 the curved end 177 of the guide rail 176 will serve as a deflector cam for properly pushing the cake into position before it reaches the band knife 40. In like manner I provide two rails 178 and 179 on the top of the machine to the rear of the turntable 97 and both of these latter mentioned rails have outwardly flared curved ends 180 which serve as deflecting cams in the event that the cake when pushed off the turntable should be moved slightly out of its proper alignment. Thus the rails 178 and 179 serve as means for properly guiding any such improperly placed cakes, to the rear conveyor belts.

In Figures 22, 23, and 24, I have illustrated my improved machine with additional band knives so as to effect the cutting of the cake into eight small cakes instead of into four cakes as possible with the machine as illustrated in the preceding figures of drawing. As shown in Figures 22 to 24 inclusive, the machine has two additional band knives $41^a$ and $41^b$ which pass over pulleys $39^a$, $39^b$, $43^a$, and $43^b$. These pulleys are mounted on suitable bearings which are secured to the frame of the machine; the cutting runs of the band knives $41^a$ and $41^b$ being in planes at opposite sides of the plane of the cutting run of the band knife 41. As shown in Figure 23, the pulley $43^b$ is rotated by a chain 181 which is driven from a sprocket 182 on the main drive shaft 35 and said chain operates a sprocket 183 on a short shaft 184 upon which the pulley $43^b$ is mounted. The pulley $43^a$ is driven by a gear wheel 185 which meshes with a gear wheel 186 on the shaft 187 to which the pulley $43^a$ is secured. The gear wheel 185 is operated by a driving chain 188 which is driven from the shaft 35 so that all three operating runs of the band knives 41, $41^a$, and $41^b$ move downward according to the drive as described and as illustrated in Figures 22 and 23. In using the three rear band knives I preferably use four sets of conveying paddles $135^a$ which are operated in the same manner as described in connection with the paddles 135. Also I preferably employ four rear conveying belts $141^a$, $141^b$, $141^c$, and $141^d$ which are operated in the same manner as the conveying belts 141 and 142 previously described. As illustrated in Figure 24 the operating run of the band knife 41 is preferably placed slightly in advance of the operating runs of the band knives $41^a$ and $41^b$ so that the cake is first cut part-way through by the band knife 41 before the band knives $41^a$ and $41^b$ start to operate. This assists in keeping the cake stable during the final cutting. While I preferably use the waved edge band knives nevertheless it will be understood that if desired for any purpose band knives having straight cutting edges such as commonly employed, can be used instead of said waved edge band knives.

Having thus described my invention, what I claim as new and desire to secure by Letters Patent is:—

1. In a cake cutting machine, a knife; cake turning means to the rear of said knife; and reciprocating upright pushers operative to successively push cakes to and past the cutting edge of said knife to be cut entirely therethrough by said knife and to transfer the cut cakes to said turning means.

2. In a cake cutting machine, a knife; cake turning means to the rear of said knife; means for conveying the cake to said knife to be cut thereby and for transferring the cut cake to said turning means; a second knife to the rear of said turning means; means for conveying the turned, cut cake to the second knife to be again cut; and means for moving the cake from said turning means to said second conveying means.

3. In a cake cutting machine, a knife; cake turning means to the rear of said knife; means for conveying the cake to said knife to be cut thereby and for transferring the cut cake to said turning means; a second knife to the rear of said turning means; means for conveying the turned, cut cake to the second knife to be cut again; and means for moving the cake from said turning means to said second conveying means, said moving means traveling at a slower speed than said second conveying means and serving as an auxiliary conveying means for the cut cake to said second knife.

4. In a cake cutting machine, cutting means; conveying belts for moving cake to and past said cutting means and upon which the cake rests; and auxiliary conveying means including paddles movable above the level of the conveying belts.

5. In a cake cutting machine, cutting means; means for conveying cake to said cutting means to be cut; a turntable upon which the cake is moved after said cutting; a second cutting means; belts for moving the cut cake to said second cutting means; and means including overhead paddles for pushing said cake off said turntable upon said belts.

6. In a cake cutting machine, cutting means; means for conveying cake to said cutting means to be cut; a turntable upon which the cake is moved after said cutting; a second cutting means; belts for moving the cut cake to said second cutting means; and means including overhead paddles for pushing said cake off said turntable upon said belts, said paddles extending over said belts and serving as an auxiliary conveying means for the cut cakes to said cutting means.

7. In a cake cutting machine, cutting means; means for conveying cake to said cutting means to be cut; a turntable upon which the cake is moved after said cutting; a second cutting means; belts for moving the cut cake to said second cutting means; and means including overhead paddles for pushing said cake off said turntable upon said belts, said paddles extending over said belts and serving as an auxiliary conveying means for the cut cakes to said cutting means, said paddles being movable at a slower speed than said belts.

8. In a cake cutting machine, a cutting knife, strip conveyors having cake pushers secured thereto and movable at opposite sides of the cutting edge of said knife; and means for reciprocating said strip conveyors.

9. In a cake cutting machine, a cutting knife; strip conveyors having cake pushers secured thereto and movable at opposite sides of the cutting edge of said knife; drums having the ends of said strip conveyors wound thereon; and means for oscillating said drums whereby the strip conveyors will effect reciprocation of said pushers.

10. In a cake cutting machine, a supporting frame; a knife; strip conveyors; a table top for said frame having cut-out portions through which parts of said strip conveyors extend to allow other parts of said strip conveyors to pass over the table top at opposite sides of said knife; and cake-moving pushers on said strip conveyors for moving the cake to said knife to be cut thereby.

11. In a cake cutting machine, a supporting frame; a knife; strip conveyors; a table top for said frame made in sections and having notches through which parts of the strip conveyors extend to allow other parts of said strip conveyors to pass over the table top at opposite sides of said knife; and cake-moving pushers on said strip conveyors for moving the cake to said knife to be cut thereby.

12. In a cake cutting machine, cake cutting means; a turntable; means for conveying the cake to said cutting means and for delivering the cut cake upon said turntable; a second cutting means; a rotatable drive member having a crank thereon; a pivotally mounted lever connected to said crank; means having lugs thereon and connected with said turntable; means connecting said lever and having a latch for engagement with said lugs for effecting the intermittent rotation of said turntable; and means for moving the cake from said turntable to said second cutting means.

13. In a cake cutting machine, two cutting means, one positioned forward of the other; cake turning means positioned between said two cutting means; means for moving cake to the forward cutting means to be cut and transferred to said turning means; longitudinally extending means positioned above said turning means and having cake-pushing members thereon operative to move the cake from said turning means toward the rear cutting means.

14. In a cake cutting machine, two cutting means, one positioned forward of the other; cake turning means positioned between said two cutting means; means for moving cake to the forward cutting means to be cut and transferred to said turning means; means for conveying the cut cake to the rear cutting means to be again cut; and longitudinally extending means positioned above said turning means and having cake pushing members thereon operative to move the cake from said turning means upon said cake conveying means.

15. In a cake cutting machine, two cutting means, one positioned forward of the other; cake turning means positioned between said two cutting means; means for moving cake to the forward cutting means to be cut and transferred to said turning means; and endless moving means positioned above said turning means and having paddles thereon movable longitudinally to push the cake off said turntable toward the rear cutting means.

16. In a cake cutting machine, a cutting knife; flexible strip cake conveyors movable at opposite sides of said knife; and means for reciprocating said conveyors.

17. In a cake cutting machine, a cutting knife; flexible strip cake conveyors movable at opposite sides of said knife; drums having portions of said strip conveyors secured thereto; and means for oscillating said drums whereby said strip conveyors are reciprocated.

18. In a cake cutting machine, a band knife; and a plurality of scrapers out of transverse alignment and transversely pressing against opposite sides of a flexible run of said knife at positions spaced apart within the length of said run to slightly bow portions of said run in the opposite directions.

19. In a cake cutting machine, a band knife; and two scrapers respectively pressing against opposite sides of a run of said knife at positions spaced apart within the length of said run to slightly bow portions of said run in opposite directions.

20. In a cake cutting machine, a band knife; two pivotally mounted scrapers respectively pressing against opposite sides of a run of said knife at positions spaced apart within the length of said run; and means for adjusting the scrapers on their pivots for varying the pressure of said scrapers upon said run of the knife.

21. In a cake cutting machine, a band knife; a plurality of scrapers pressing against opposite sides of a run of said knife at positions spaced apart within the length of said run; and troughs carried by said scrapers.

22. In a cake cutting machine, a knife; strip conveying means movable adjacent said knife; cake pushers on said strip conveying means; means for reciprocating said strip conveying means; and means for adjusting the position of said cake pushers in the direction of the length of said strip conveying means.

23. In a cake cutting machine, cutting means; endless belts for conveying the cake to said cutting means and having portions movable adjacent opposite sides of said cutting means; a supporting structure; a table top for said supporting structure; belt-supporting means located under the top runs of said belts; grooved rollers over which said belts pass; lugs on said belts movable through the grooves of said rollers; and a bridge for supporting said belt-supporting means.

24. In a cake cutting machine, a cutting knife; resilient flexible strip cake conveyors arranged in a pair and movable at opposite sides of said knife; drums each having portions of said strip conveyors wound thereon; means for guiding portions of said strip conveyors in a straight path; and means for oscillating said drums whereby said strip conveyors are reciprocated.

In testimony whereof, I have signed my name to this specification, in the presence of two subscribing witnesses.

EUGENE H. DAVIS.

Witnesses:
HARRY T. ROTENBURY,
MARGUERITE VANSANT.